United States Patent

Minami et al.

[11] 3,966,011
[45] June 29, 1976

[54] RETARDER CONTROL DEVICE

[75] Inventors: Teruo Minami, Yokohama; Masaru Uenoyama, Kawasaki, both of Japan

[73] Assignee: Kabushiki Kaisha Komatsu Seisakusho, Tokyo, Japan

[22] Filed: June 25, 1974

[21] Appl. No.: 482,904

[30] Foreign Application Priority Data
Nov. 21, 1973 Japan.............................. 48-130131

[52] U.S. Cl............................... 180/105 E; 303/3; 303/13; 303/84 A
[51] Int. Cl.².......................................... B60T 7/12
[58] Field of Search.................. 303/13, 14, 2, 3, 20, 303/84 A, 11; 180/105 E, 105 R, 82 R, 77 R; 317/19; 192/3 H

[56] References Cited
UNITED STATES PATENTS

| | | | |
|---|---|---|---|
| 2,292,105 | 8/1942 | Davis | 303/13 |
| 2,803,785 | 8/1957 | Desch | 317/19 |
| 3,497,267 | 2/1970 | Dobrikin | 303/3 X |
| 3,601,451 | 8/1971 | Cummins et al. | 303/13 |
| 3,730,596 | 5/1973 | Felix et al. | 303/13 X |
| 3,800,904 | 4/1974 | Zelenka | 180/105 E |
| 3,802,529 | 4/1974 | Burckhardt et al. | 180/105 E X |

*Primary Examiner*—Duane A. Reger
*Assistant Examiner*—Douglas C. Butler
*Attorney, Agent, or Firm*—Armstrong, Nikaido & Wegner

[57] ABSTRACT

A retarder control device for a vehicle with an oil-cooled multi-plate disc brake which has solenoid and hand brake valves assembled in parallel with a pneumatic line. A check valve is provided at the pneumatic pressure line for checking oil flow from the solenoid and hand brake valves, and thus the rear brake is manually and automatically operated.

3 Claims, 4 Drawing Figures

RETARDER CONTROL DEVICE

BACKGROUND OF THE INVENTION

This invention relates to a disc brake for a vehicle, and more particularly to a retarder control device for a vehicle with an oil-cooled multi-plate disc brake.

SUMMARY OF THE INVENTION

It is an object of the present invention to provide a retarder control device for a vehicle with an oil-cooled multi-plate disc brake which may automatically operate a rear brake so as to enhance the reliability of the brake.

It is another object of the present invention to provide a retarder control device for a vehicle with an oil-cooled multi-plate disc brake which may easily be operated manually and automatically in safety and in high endurability.

BRIEF DESCRIPTION OF THE DRAWINGS

These and other objects, features and advantages of the retarder control device for a vehicle with an oil-cooled multi-plate disc brake according to the present invention will become more fully apparent from the following description taken in conjunction with the accompanying drawings, in which.

DESCRIPTION OF THE PREFERRED EMBODIMENT

Figure 1:
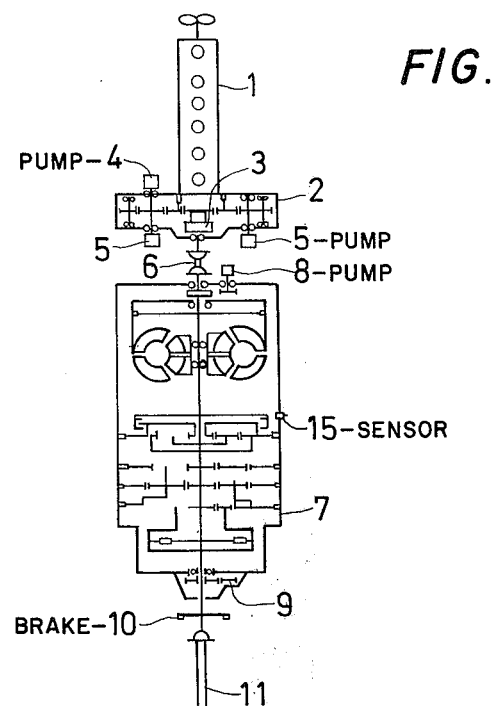
FIG. 1 is a schematic view of the power train of the vehicle.

Referring to the drawings, which show one embodiment of the device of the present invention, numeral 1 is an engine, 2 a power take-off which serves to distribute engine power to a transmission and pumps, 3 a damper, 4 a PTO scavenger pump, 5 a hydraulic pump for feeding fluid to the control device except the transmission, 6 a coupling, 7 a forward six-gear ranges and reverse one-gear range transmission, 8 a charging pump for the transmission, 9 a speedometer outlet, 10 a parking brake, 11 a propeller shaft, 12 a differential gear, 13 a final drive, and 14 a tire which form the power train of the vehicle.

Numeral 15 indicates a sensor for detecting the output shaft speed of the torque converter. A low range clutch which is provided in the transmission 7 so as to fact the sensor 15 is a rotary clutch having projections on the outer periphery thereof in a manner that it operates to generate a pulse signal to a line 211 of an electronic circuit F as shown in FIG. 4 every time the projection approaches the sensor.

Figure 2:
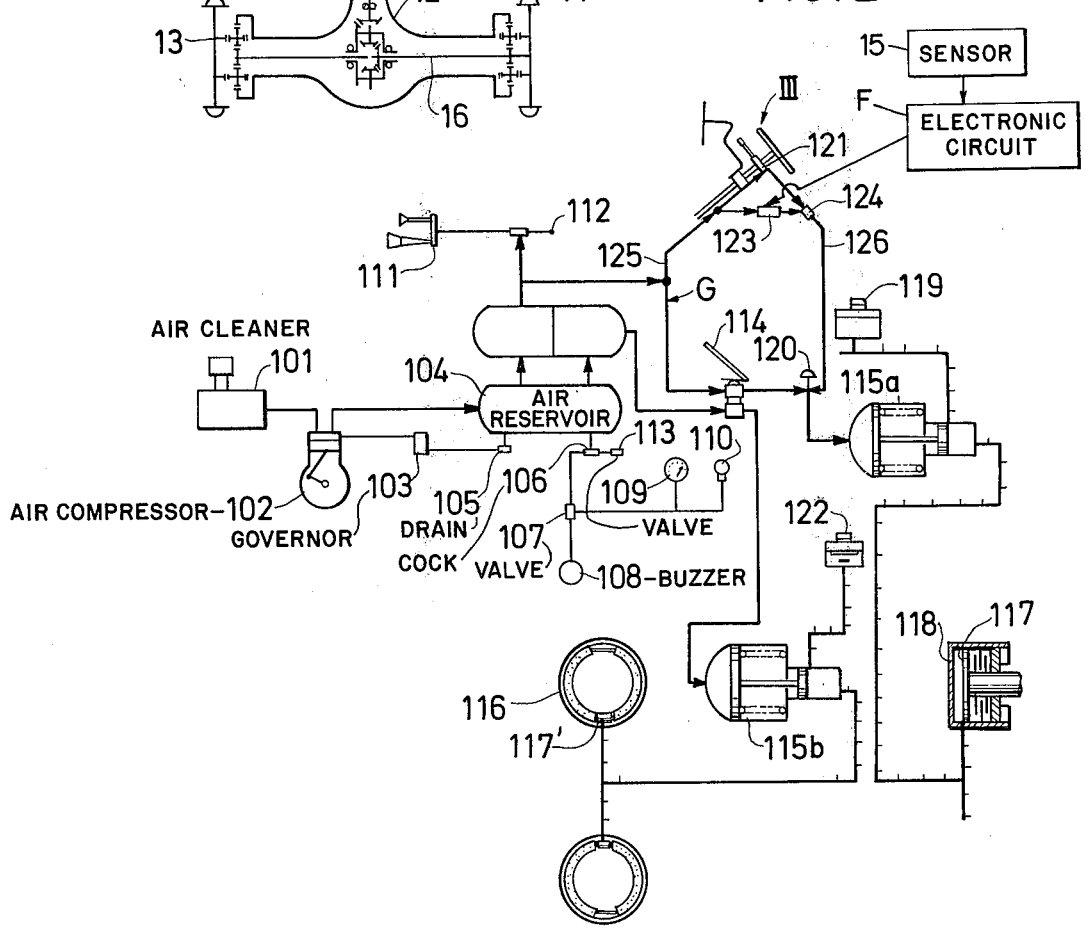
FIG. 2 is a schematic view of the air and oil lines of the brake control system of the present invention.
Figure 3:
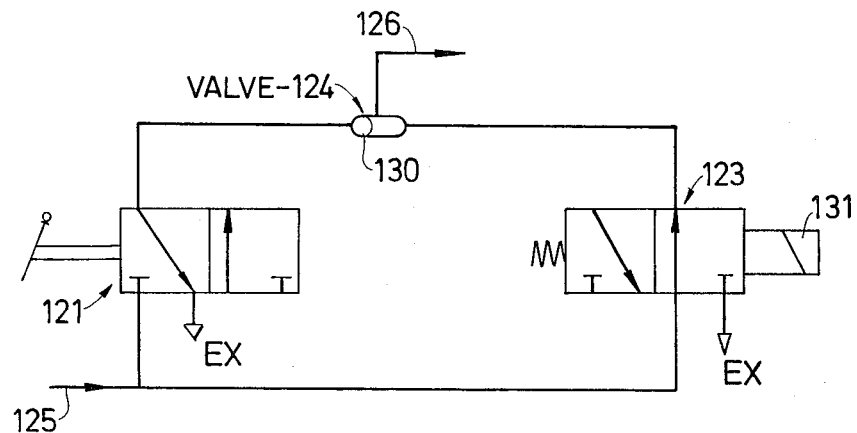
FIG. 3 is a partial detailed view of the part indicated by III in FIG. 2.

Numeral 16 is an axle output shaft for driving a final drive 13. This final drive 13 uses a planetary gear mechanism including a sun gear input and a carrier output, and a disc brake device comprising a plurality of discs, a pressure plate and a piston is disposed between the carrier and the housing. In FIG. 2, numeral 101 is an air cleaner, 102 is a compressor driven by the engine 1, 103 an air governor, 104 air reservoir, 105 a drain, 106 a chamber cock, 107 an air valve cock, and 108 a buzzer which rings when the air line is reduced to a pressure below a predetermined value. 109 is a pressure gauge, 110 a pilot lamp, 111 a horn, 112 a horn switch, 113 a safety valve, and 114 a dual brake valve having a pedal so operated that when this pedal is depressed, the front and rear wheel brakes are engaged. 115a and 115b are rear and front brake chambers, respectively, for converting pneumatic pressure to hydraulic pressure. 116 is a front brake drum, 117' a wheel cylinder provided in the drum 116, and 118 is a rear brake cylinder including the disc brake device therein. 117 is a piston inserted into the cylinder 118, 119 a rear brake oil tank, 120 a brake lamp switch, and 121 a hand brake valve which is manually operated as a retarder operating valve. 122 is a front brake oil tank, and 123 a solenoid valve. 124 is a check valve for checking the air flow from the hand brake and solenoid valves 121 and 123, and 125 and 126 are lines of pneumatic pressure line G. In FIG. 3, which is a fragmental enlarged schematic view of the portion III in FIG. 2, numeral 130 denotes a check ball provided in the check valve 124, and 131 a solenoid for switching the solenoid valve 123. As shown in FIG. 3, when the valve 123 is operated by energizing the solenoid 131 while the hand brake valve 121 is not operated, the check ball 130 is urged to the left end of the check valve 124 by pneumatic pressure of air supplied through the solenoid valve 123 from the pneumatic line 125 so that the pneumatic line 126 is connected with the line 125.

Figure 4:
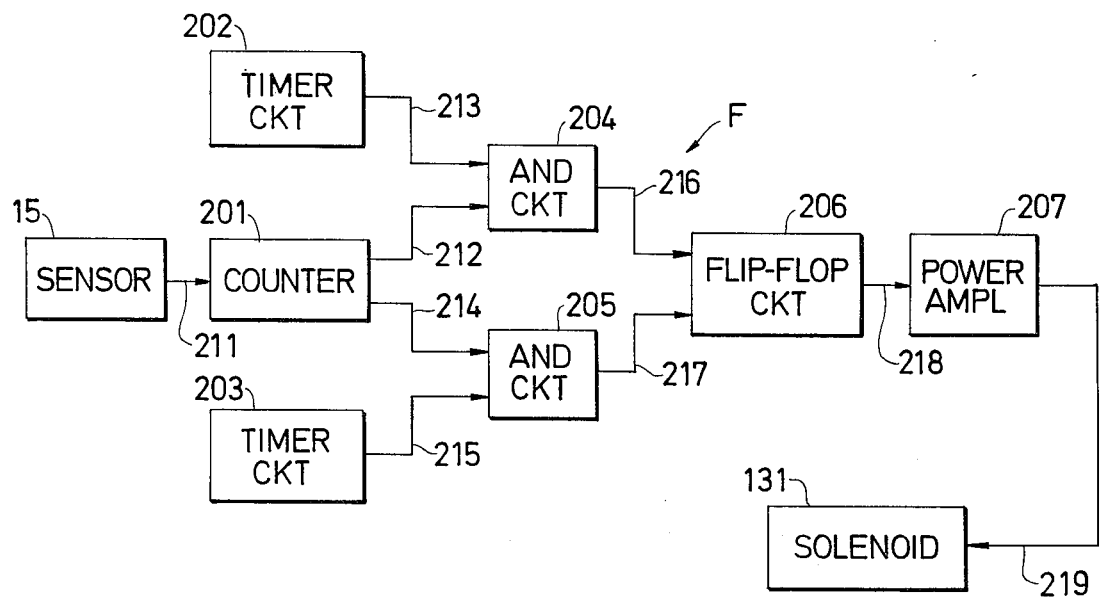
FIG. 4 is a block diagram of an electronic circuit of the detecting and controlling portion of the device of the present invention.

Referring now to FIG. 4, which shows an electronic circuit F of the detecting and controlling portion, numeral 201 is a counter for counting the pulses generated at the line 211 for producing a pulse signal. When the output shaft speed or a number of revolutions of the output shaft of the torque converter exceed a predetermined speed, the pulse signal is transmitted through a line 212 at an output terminal of the counter, and when the speed or number of revolutions are decreased below a predetermined value, the signal is transmitted through a line 214. Numerals 202 and 203 indicate timer circuits for generating clock pulse signals of a constant period to the lines 213 and 215, respectively, 204 is an AND circuit for generating signals to the line 216 by the logic product of the signal of the lines 213 and 212, and 205 is an AND circuit for generating signals to the line 217 by the logic product of the signals of the lines 214 and 215. 206 is a flip-flop for cancelling the signal on line 218 by being reset by the line 217 and for generating signals on line 218 by being set by the signal of the line 216. 207 is a power amplifier for energizing and deenergizing the solenoid 131 as the load. 207 includes switching transistors connected in a Darlinton configuration known per se for energizing and deenergizing an electric current is the line 219.

In operation of the thus constructed retarder control device of the present invention, the engine speed is automatically detected by the sensor 15 and compared with a predetermined speed in the electronic circuit F. For example, when the engine speed is beyond the predetermined speed, an electrical signal is transmitted through the sensor 15 to the circuit F. As a result, the solenoid 131 is energized so as to operate th solenoid valve 123 as shown in FIG. 3 so that the pneumatic line 126 is connected with the pneumatic line 125 through the check valve 124. Thus, the pneumatic pressure in the pneumatic line 126 actuates the brake chamber 115a of the rear brake so that brake oil applied in to the cylinder 118 of the rear brake is pressurized to urge the piston 117 in the cylinder 118, thereby effecting the rear brake.

On the other hand, when the hand brake valve 121 is operated while the solenoid 131 is deenergized, the check ball 130 of the check valve 124 is urged to the right end of the check valve 124 by the action of pneumatic pressure of air supplied through the hand brake valve 121 from the pneumatic line 125 so as to connect the line 125 with the line 126 so that the rear braking operation can be manually performed.

The block diagram in FIG. 4 shows the signal flow, but does not show a power supply and the source of hydraulic pressure.

It will be understood from the foregoing description that since the retarder control device for the vehicle with the oil-cooled multi-plate disc brake of the present invention comprises a solenoid valve 123 and hand brake valve 121 assembled in parallel with a pneumatic line G connected from the pneumatic pressure generating portion to the chamber and cylinder 115 of a rear brake. The check valve 124 is provided at the pneumatic pressure line G for checking the air flow from the solenoid and hand brake valves 123 and 121 in such a manner that the solenoid 131 of the solenoid valve 123 is operated by an electronic circuit F with a detecting and controlling portion using a omplete contactless circuit. The solenoid valve 123 may operate the chamber and cylinder 115 of rear brake side by the energization of the solenoid 131 so as to automatically operate the rear brake as an automatic retarder, and accordingly the reliability of the brake is improved, and manual and automatic operations of the brake become easy and in safety by inserting the check valve 124 thereto.

It will also be understood that since a complete contactless circuit is used in the energization and deenergization of the solenoid 131 in the device of this invention, endurability is greatly enhanced compared with the conventional relay type.

What is claimed is:
1. A retarder control device for a vehicle having a drive train, including a torque converter, and an oil-cooled multi-plate disc brake comprising solenoid and hand brake valves connected in parallel to a pneumatic line connected from a pneumatic pressure generating source to a chamber and cylinder of the brake, a check valve provided in the pneumatic pressure line for checking oil flow from the solenoid and hand brake valves and an electronic circuit means responsive to the rotational speed of the torque converter for controlling the energization of the solenoid of the solenoid valve and thereby the application of the brake.

2. The device of claim 1, wherein said electronic circuit means is solid state.

3. The device of claim 1, wherein said electronic circuit means comprises:
   a. a sensor for detecting the speed of the torque converter;
   b. counter means coupled to said sensor for generating a pulse signal in response to the output of said sensor;
   c. first timer means;
   d. first AND circuit means, wherein said counter means and said first timer means are coupled to the inputs of said first AND circuit means;
   e. second timer means;
   f. second AND circuit means, wherein said counter means and said second timer means are coupled to second AND circuit means;
   g. FLIP-FLOP circuit means having a set input coupled to said first AND circuit means and a reset input coupled to said second AND circuit means; and
   h. amplifier means coupled to the output of said FLIP-FLOP means, wherein the output of said amplifier means is coupled to said solenoid.

* * * * *